(12) United States Patent
Chao et al.

(10) Patent No.: US 11,087,218 B2
(45) Date of Patent: Aug. 10, 2021

(54) ELECTRONIC DEVICE, PRESENTATION METHOD FOR DECISION-MAKING PROCESS MODULE AND COMPUTER READABLE MEDIUM

(71) Applicant: Industrial Technology Research Institute, Hsinchu (TW)

(72) Inventors: August Chao, Penghu County (TW); Hao-Ren Wu, Yunlin County (TW); Guan-Cheng Huang, Tainan (TW); Li-Yang Chen, Tainan (TW); Yi-Lin Tsai, Pingtung County (TW)

(73) Assignee: Industrial Technology Research Institute, Hsinchu (TW)

( * ) Notice: Subject to any disclaimer, the term of this patent is extended or adjusted under 35 U.S.C. 154(b) by 895 days.

(21) Appl. No.: 15/856,076

(22) Filed: Dec. 28, 2017

(65) Prior Publication Data

US 2019/0180190 A1    Jun. 13, 2019

(30) Foreign Application Priority Data

Dec. 8, 2017   (TW) .................................. 106143262

(51) Int. Cl.
*G06F 3/048*       (2013.01)
*G06N 5/02*        (2006.01)
(Continued)

(52) U.S. Cl.
CPC ............. *G06N 5/02* (2013.01); *G06F 3/0482* (2013.01); *G06F 3/04817* (2013.01);
(Continued)

(58) Field of Classification Search
CPC ....... G06N 5/02; G06F 40/30; G06F 3/04817; G06F 3/0482; G06Q 30/0631
See application file for complete search history.

(56) References Cited

U.S. PATENT DOCUMENTS 7,212,985 B2    5/2007 Sciuk
7,792,858 B2 *  9/2010 Tang ................... G06F 16/3322
                                                 707/780
(Continued)

FOREIGN PATENT DOCUMENTS

CN       1508726        6/2004
CN       103399916      11/2013
(Continued)

OTHER PUBLICATIONS

Mitchel Resnick et al., "Scratch: Programming for All", Communications of the ACM, Nov. 2009, pp. 60-67.
(Continued)

*Primary Examiner* — David Phantana-angkool
(74) *Attorney, Agent, or Firm* — JCIPRNET

(57) ABSTRACT

An electronic device, a presentation method for a decision-making process module and a non-volatile computer readable medium are provided. The electronic device includes a memory, a processor and a display. The processor generates or obtains a decision-making process module for determining a particular object. The display presents the decision-making process module. The decision-making process module includes a plurality of decision-making sub-processes and a plurality of decision-making blocks. The decision-making sub-processes verify and integrate the information about the particular object received from the source. The decision-making blocks are formed by arranging one or some of a plurality of decision-making sub-processes, and the decision-making process modules are formed by arranging the decision-making blocks. A sequence of the decision-making sub-processes arranged in the decision-making blocks is adjusted or edited by the processor, and a sequence of the decision-making blocks arranged in the decision-
(Continued)

making process module is adjusted or edited by the processor.

21 Claims, 7 Drawing Sheets

(51) Int. Cl.
   *G06Q 30/06* (2012.01)
   *G06F 3/0482* (2013.01)
   *G06F 3/0481* (2013.01)
   *G06F 40/30* (2020.01)
   *H04L 29/06* (2006.01)

(52) U.S. Cl.
   CPC ......... *G06F 40/30* (2020.01); *G06Q 30/0631* (2013.01); *H04L 67/42* (2013.01)

(56) References Cited

U.S. PATENT DOCUMENTS

| | | | |
|---|---|---|---|
| 7,797,204 B2 | 9/2010 | Balent | |
| 8,170,971 B1* | 5/2012 | Wilson | G06N 5/022 706/46 |
| 8,862,457 B2 | 10/2014 | Martino et al. | |
| 9,304,989 B2 | 4/2016 | Spivack et al. | |
| 9,595,041 B2 | 3/2017 | Wanker | |
| 10,192,176 B2* | 1/2019 | Kotler | G06Q 10/0631 |
| 10,796,321 B1* | 10/2020 | Balakrishnan | G06Q 30/0631 |
| 10,839,325 B2* | 11/2020 | Fowler | G06Q 10/1095 |
| 10,878,016 B2* | 12/2020 | Eckardt | G06F 16/338 |
| 2004/0075681 A1 | 4/2004 | Anati | |
| 2004/0210592 A1 | 10/2004 | Ciolfi et al. | |
| 2006/0106847 A1* | 5/2006 | Eckardt | G06F 16/3323 |
| 2007/0142022 A1 | 6/2007 | Madonna et al. | |
| 2008/0147453 A1 | 6/2008 | Kogan et al. | |
| 2008/0168135 A1 | 7/2008 | Redlich et al. | |
| 2011/0107260 A1* | 5/2011 | Park | G06Q 10/04 715/811 |
| 2014/0095285 A1 | 4/2014 | Wadell et al. | |
| 2014/0173602 A1* | 6/2014 | Kikin-Gil | G06Q 10/1097 718/100 |
| 2014/0278754 A1* | 9/2014 | Cronin | G06F 16/24578 705/7.29 |
| 2014/0330594 A1* | 11/2014 | Roberts | G06Q 10/06316 705/4 |
| 2015/0006426 A1* | 1/2015 | Sobhani | G06Q 20/10 705/329 |
| 2015/0271557 A1* | 9/2015 | Tabe | H04N 21/6131 725/14 |
| 2016/0048498 A1 | 2/2016 | Kim et al. | |
| 2016/0260152 A1* | 9/2016 | Lagoni | G06Q 30/0625 |
| 2016/0307258 A1 | 10/2016 | May | |
| 2016/0364777 A1 | 12/2016 | Josefiak | |
| 2017/0345105 A1* | 11/2017 | Isaacson | G06Q 30/0633 |
| 2018/0129995 A1* | 5/2018 | Fowler | G06Q 10/1095 |
| 2019/0012718 A1* | 1/2019 | Vadlamudi | G06F 17/18 |
| 2019/0230070 A1* | 7/2019 | Isaacson | G07G 1/0036 |
| 2019/0306137 A1* | 10/2019 | Isaacson | G06Q 30/0635 |
| 2021/0019791 A1* | 1/2021 | Selvaraj | G06N 20/00 |

FOREIGN PATENT DOCUMENTS

| | | |
|---|---|---|
| CN | 106202186 | 12/2016 |
| CN | 106503907 | 3/2017 |
| CN | 104240107 | 12/2017 |
| TW | 201435759 | 9/2014 |
| TW | I453684 | 9/2014 |
| TW | I484409 | 5/2015 |
| TW | I562000 | 12/2016 |

OTHER PUBLICATIONS

Heng-Li Yang and Aug. F. Y. Chao, "Sentiment analysis for Chinese reviews of movies in multi-genre based on morpheme-based features and collocations", Information Systems Frontiers, Dec. 2015, pp. 1335-1352.

"Notice of allowance of Taiwan Counterpart Application", dated Nov. 30, 2018, p. 1-p. 4.

"Office Action of China Counterpart Application", dated Dec. 14, 2020, p. 1-p. 9.

* cited by examiner

ELECTRONIC DEVICE, PRESENTATION METHOD FOR DECISION-MAKING PROCESS MODULE AND COMPUTER READABLE MEDIUM

CROSS-REFERENCE TO RELATED APPLICATION

This application claims the priority benefit of Taiwan application serial no. 106143262, filed on Dec. 8, 2017. The entirety of the above-mentioned patent application is hereby incorporated by reference herein and made a part of this specification.

TECHNICAL FIELD

The disclosure relates to an electronic device, a presentation method for a decision-making process module, and a computer readable medium.

BACKGROUND

As shopping via on-line shopping, third-party payment and the like becomes more and more popular, it is much more convenient to make a purchase, and the consumers' willingness to purchase is also facilitated. Due to the easy accessibility of on-line information, the consumers usually need to read or check relevant information (e.g., user experience, product ratings, prices, shipping and payment methods, sales information, and/or the like) before they make a purchase, so as to conveniently choose a product or relevant services.

Currently, relevant information about products or services of various shopping platforms is too sparse, and sources trusted by the users are varied. For example, some consumers may find products or services recommended or discussed in a specific on-line forum or by a specific expert more acceptable, and trust information from shopping platforms less. Under such circumstance, the consumers need to obtain information about a product or service from multiple sources before buying the product. In this case, it takes the consumers longer to sort out the information, which may affect the consumers' efficiency to make a purchase or even affect the consumers' willingness to buy in impulsive purchase.

SUMMARY

One or some exemplary embodiments of the disclosure provide an electronic device and a presentation for a decision-making process module capable of building a customized decision-making process for purchasing when the user intends to make a purchase. In addition, the decision-making process for purchasing may be further adjusted or edited based on the user's consideration and preference, so as to conveniently choose a product or relevant services.

An embodiment of the disclosure provides a memory, a processor, and a display. The processor is coupled to the memory and generates a decision-making process module for determining a particular object. The display is coupled to the processor to present the decision-making process module. The decision-making process module includes a plurality of decision-making sub-processes and a plurality of decision-making blocks. The decision-making sub-processes verify and integrate information about the particular object received from a source. The decision-making blocks are formed by arranging one or some of the decision-making sub-processes, and the decision-making process module is formed by arranging the decision-making blocks, A sequence of the one or some of the decision-making sub-processes arranged in the decision-making blocks is adjusted or edited by the processor, a sequence of the decision-making blocks arranged in the decision-making process module is adjusted or edited by the processor, and the adjusted or edited decision-making process module searches information on a network based on a built function and presents a determination result.

An embodiment of the disclosure provides a presentation method for a decision-making process module. The presentation method includes: generating or obtaining a decision-making process module for determining a particular object; and presenting the decision-making process module. In addition, the step of generating the decision-making process module for determining the particular object includes: setting a plurality of decision-making sub-processes to verify and integrate information about the particular object received from a source; setting a plurality of decision-making blocks formed by arranging one or some of the decision-making sub-processes, wherein the decision-making process module is formed by arranging the decision-making blocks; adjusting or editing a sequence of the one or some of the decision-making sub-processes arranged in the decision-making blocks; adjusting or editing a sequence of the decision-making blocks arranged in the decision-making process module; and searching information on a network by the adjusted or edited decision-making process module based on a built function and presenting a determination result.

An embodiment of the disclosure provides a non-volatile computer readable medium. The non-volatile computer readable medium stores a plurality of programming codes, and the programming codes are loaded to a processor to perform the presentation method.

Based on the above, the electronic device, the presentation method for the decision-making process module, and the non-volatile computer readable medium according to the embodiments of the disclosure allow the user to build a combination of various decision-making sub-processes for purchasing on his/her own, so as to form the decision-making process module. Specifically, the user may obtain the decision-making sub-processes based on the relevant information (e.g., relevant information and comments about the product or the service) on the network, and the decision-making sub-processes may be arranged to form the decision-making blocks. The user may also adjust or edit the decision-making blocks through the processor based on personal needs, so as to build the decision-making process module with personalization. Besides, the user may also share the edited decision-making process module to the network for the reference of other users afterwards. Hence, the user may refer to information such as the specification, recommendation information, expert's suggestion and/or the like about the relevant object (product or service) from the network through the decision-making process module built by others and thus spend less time on browsing the information about the object. Hence, the efficiency and the willingness for consumers to make a purchase are facilitated.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
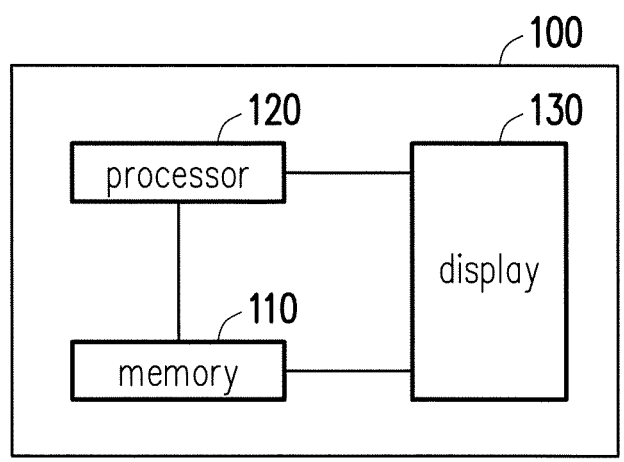
FIG. 1 is a block diagram illustrating an electronic device according to an embodiment of the disclosure.

FIG. 1 is a block diagram illustrating an electronic device 100 according to an embodiment of the disclosure. The electronic device 100 includes a memory 110, a processor 120, and a display 130. The processor 120 is coupled to the memory 110 to generate or obtain a decision-making process module for determining a particular object. The display 130 is coupled to the processor 120 to present the decision-making process module. The particular object in the embodiment may be a product or a service that the user intends to buy. Nevertheless, the disclosure is not limited thereto.

In the embodiment, the electronic device 100 may be a laptop computer, a tablet computer, a smartphone, or a personal digital assistant (PDA), for example. However, the disclosure is not limited thereto. The user may make a purchase of the product or the service through the electronic device 100, and may complete a customized decision-making process for purchasing on the electronic device 100. Besides, the memory 110 may be a resistive random access memory (RRAM), a ferroelectric random access memory (FeRAM), a magnetoresistive random access memory (MRAM), a phase change random access memory (PRAM), or a conductive bridge random access memory (CBRAM), for example. However, the disclosure is not limited thereto. The processor 120 may be a central processing unit (CPU) or other programmable general-purpose or specific-purpose microprocessors, digital signal processors (DSPs), programmable controllers, application specific integrated circuits (ASICs), other similar devices, or a combination thereof, for example. However, the disclosure is not limited thereto. The display 130 may be a device having a display function, such as a liquid crystal display (LCD) or an organic light emitting diode (OLED) display.

Figure 2:
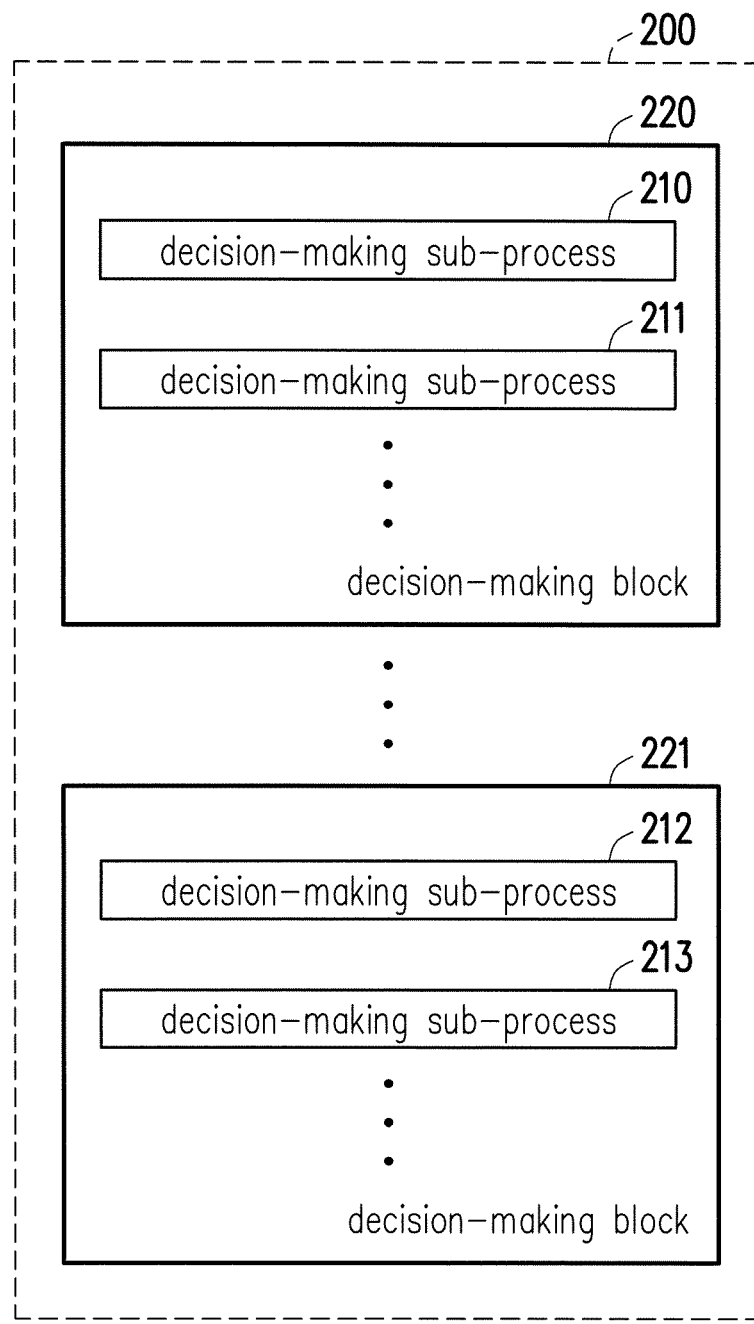
FIG. 2 is a block diagram illustrating a decision-making process module according to an embodiment of the disclosure.

Referring to FIGS. 1 and 2, FIG. 2 is a block diagram illustrating a decision-making process module 200 according to an embodiment of the disclosure. The decision-making process module 200 may include a plurality of decision-making blocks (two decision-making blocks 220 and 221 shown herein for an illustrative purpose). Each of the decision-making blocks 220 and 221 is formed by arranging one or some of a plurality of decision-making sub-processes 210 to 213. For example, the decision-making block 220 includes the decision-making sub-processes 210 to 211, and the decision-making block 221 includes the decision-making sub-processes 212 to 213. The decision-making process module 200 may be formed by arranging the decision-making blocks 220 to 221.

The decision-making sub-processes 210 to 213 of the embodiment are sub-modules formed by combining sources (e.g., social websites, forums, shopping websites, product pages, navigated products, etc.), object parameters (e.g., price, shipping method, payment method, sales information, specification, time, range of price variation, rating, etc.), or descriptions related to the particular object. The processor 120 may obtain object information and comments on the object from the corresponding sources and analyze, filter, and sort the object information and comments for verification and integration. In one or some decision-making sub-processes 210 to 213 of the embodiment, the information about the particular object received from the source is analyzed, filtered, and categorized by using natural language processing. Accordingly, the processor 120 may perform adjustment or editing afterwards based on analyzed, filtered, and categorized object information.

In the embodiment, the object information and corresponding comments on the object in the decision-making sub-processes 210 to 213 may be stored in a network or a relevant network database. The object information and/or comments on the object may include one or a combination of diversified information including the decision-making process module recommended by an expert in a field of the particular object, insights/experiences about the particular object shared on relevant social websites, forums, shopping websites or product pages, brands or prices of the particular object, shipping methods, payment methods, sales information, and the like. However the disclosure is not limited thereto.

Specifically, before the user purchases a specific product or a specific service (referring to the particular object), the user may set the decision-making sub-processes 210 to 213 through the electronic device 100 in order for the user to obtain information about the particular object to further learn the performance, user feedback, maintenance, and the like of the particular product that may serve as the basis of purchasing. The decision-making sub-processes 210 are configured to set up any information or parameters about the particular object intended to be obtained. The information or parameters may include brands, colors, sizes, and functions of the particular object, for example, and may also include related comments or discussions on the particular object by other users, for example. Nevertheless, the disclosure is not limited thereto.

On the other hand, after completing setting of relevant parameters in the decision-making sub-processes 210 to 213, the user may adjust or edit a sequence of arrangement of one or some of the decision-making sub-processes 210 to 213 by the processor 120 to build the decision-making blocks 220 to 221 based on a personal consideration or preference. Besides, the processor 120 may also adjust or edit a sequence of the decision-making blocks 220 to 221 arranged in the decision-making process module 200 based on the user's consideration or preference. In other words, based on one or part of the information about the product that the user emphasizes (e.g., brands, colors, sizes and functions of the product) and the user's needs, the processor 120 may allow the user to manually adjust the sequence of arrangement of the decision-making sub-processes 210 to 213 or the decision-making blocks 220 to 221. Accordingly, the user may present the decision-making process module 200 with personalization through the processor 120 and the display 130. The adjusted or edited decision-making process module 200 may search information on a network based on a built function of the decision-making process module 200 to generate a determination result for the users as reference. In addition, the user may also transmit a determination result of the decision-making process module 200 to the display 130 through the processor 120. Accordingly, the user may edit or adjust the decision-making process module 200 on the display 130 and present the determination result. In the embodiment, regarding adjusting the sequence of arrangement of the decision-making sub-processes 210 to 213 or the decision-making blocks 220 to 221, the user may make arrangement through assistance of buttons on the display 130 or make the adjustment by clicking or dragging by using an auxiliary device such as a gesture or a mouse.

Figure 3:
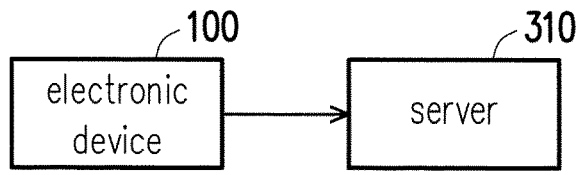
FIG. 3 is a block diagram illustrating sharing a decision-making process module to a network according to an embodiment of the disclosure.

Referring to FIGS. 1 to 3, FIG. 3 is a block diagram illustrating sharing the decision-making process module 200 to a network according to an embodiment of the disclosure. In the embodiment, the user may transmit the decision-making process module 200 completed in the electronic device 100 to a server 310 through the processor 120. Accordingly, the built decision-making process module 200 may be shared to the network. Consequently, the decision-making process module 200 may be provided for reference of other users having the same need for the product afterwards. In other words, in the electronic device 100, in addition to adjusting or editing the decision-making sub-processes 210 to 213 and the decision-making blocks 220 to 221, thereby displaying the decision-making process module 200 with personalization built by the user through the display 130, the user may also share the finished decision-making process module 200 to the network through the server 310, so as to create an additional value.

Figure 4:
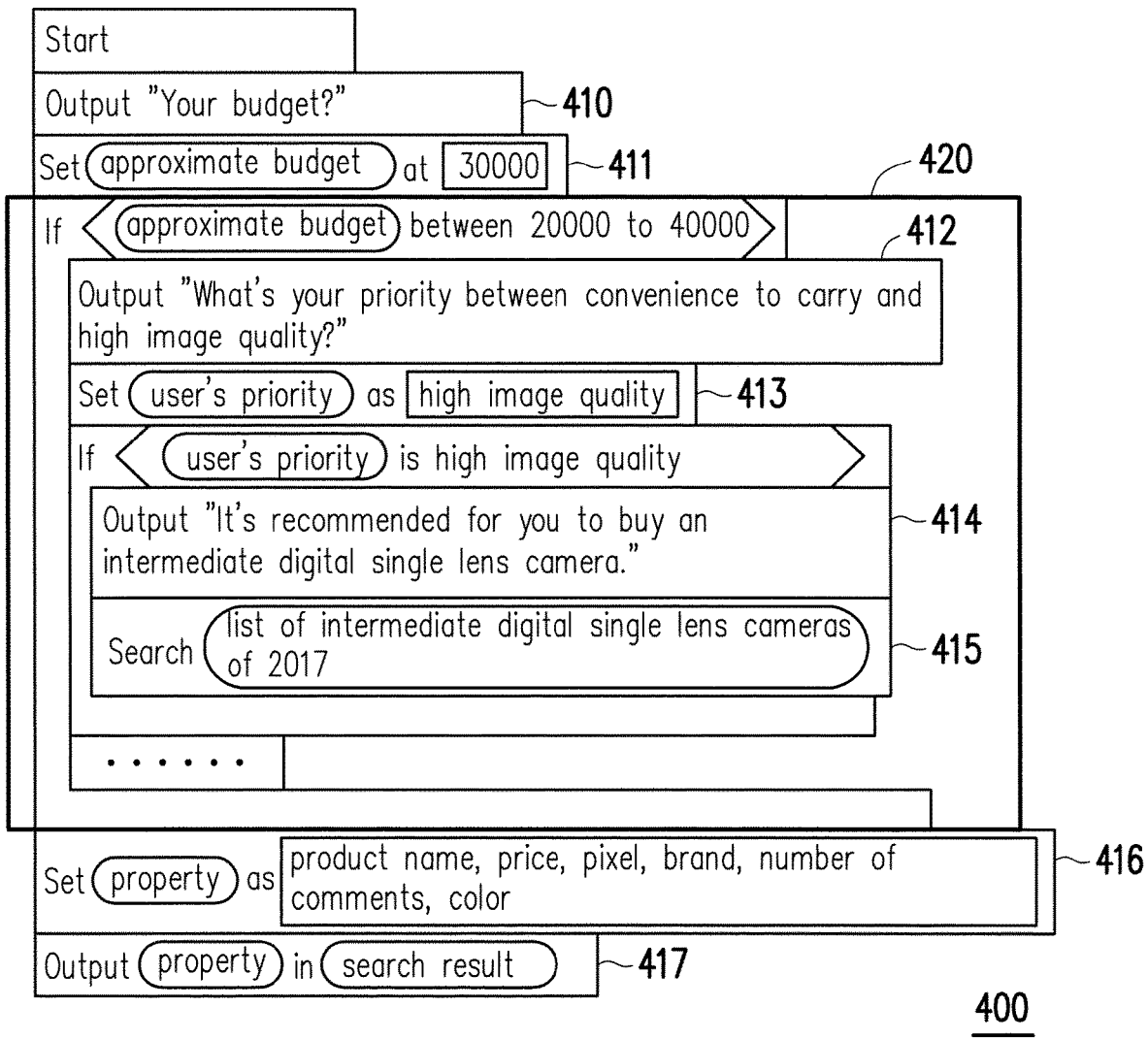
FIG. 4 is a block diagram illustrating a decision-making process module according to another embodiment of the disclosure.

Referring to FIGS. 1 and 4, FIG. 4 is a block diagram illustrating a decision-making process module 400 according to an embodiment of the disclosure. The decision-making process module 400 includes a plurality of decision-making sub-processes 410 to 417 and a decision-making block 420. In the embodiment, assuming that the product that the user intends to purchase is a camera, camera is adopted as a reference product in the embodiment. Nevertheless, the disclosure is not limited thereto. Specifically, based on the user's personal consideration or preference, the user may set "Your budget?" in the decision-making sub-process 410, and set "NTD 30,000" in the decision-making sub-process 411. In other words, when the user intends to purchase the product, what is firstly considered is the price of the product, and the budget of the user to purchase the product is 30,000 New Taiwan Dollars (NTD). In addition, in the embodiment, the user may further set "What is your priority between convenience to carry or high image quality?" in the decision-making sub-process 412, and set "high image quality" in the decision-making sub-process 413. In other words, what is considered secondly is whether an image rendered by the camera has a high image quality. In the embodiment, the user may further set or take other parameters of the particular object into consideration. Such parameters may include, for example, the brand, color, size, and function of the product. Nevertheless, the disclosure is not limited thereto.

Then, regarding the parameters set in the decision-making sub-processes 410 to 413, the user may obtain relevant information corresponding to the product from the network through the processor 120. Besides, the processor 120 may analyze, filter, and sort the relevant information through natural language processing. Then, based on the analyzed, filtered, and categorized information, it is determined at the decision-making sub-process 414 that "It's better for you to buy an intermediate digital single lens camera" and a search for "a list of intermediate digital single lens cameras of 2017" is displayed at the decision-making sub-process 415. Accordingly, the processor 120 may obtain product information relating to "a list of intermediate digital single lens cameras of 2017" from the network and provide the product information to the user for the user's reference. Accordingly, the user may continuously narrow down the result searched from the network through the processor 120. Hence, the user may is provided with an interactive scenario to choose the most suitable product or service. In the embodiment, the user may also suitably adjust or edit the parameters in the decision-making sub-processes 410 to 415 through the processor 120 based on the user's personal consideration or preference. The user may set a relevant property or relevant information that the user intends to obtain in the decision-making sub-process 416. For example, the user may input "product name", "price", "pixels", "brand", "number of comments", "color", and/or the like. Nevertheless, the disclosure is not limited thereto. Besides, a "property" of the output search result may be set in the decision-making sub-process 417. Accordingly, the output search result may be output or displayed on the display 130 based on the property set in the decision-making sub-process 416.

Analyzing, filtering, and sorting relevant data of the product by the processor 120 in the embodiment mainly includes capturing determination equations in the decision-making sub-processes 410 to 417 or the decision-making block 420 through natural language processing and connecting the determination equations with each other. In addition, the processor 120 may look for keywords or data related to the product on the network based on the connected determination equations to provide reference information to the user when the user intends to make a purchase.

Specifically, in the purchasing decision-making process of the user, individual needs of decision-making of the user when the user makes a purchase may be satisfied through repetitive product searches and comment analyses at multiple stages. For example, when the user searches a product with the electronic device 100, the processor 120 may learn semantic contents (e.g., the name and properties of the product) input by the user through natural language processing, and look for matching product items on the network based on the semantic contents. More specifically, natural language processing is capable of analyzing the user's description about the product, identifying linguistic items of a syntactic category (e.g., phrasal properties, contexts, concepts, or dependencies and hierarchical structure in sentence) used in the user's search, filtering out data irrelevant to the product, and/or the like. Besides, in the embodiment, a relevance between the description about the product and a result of linguistic identification of the sentence may be calculated through an algorithm in natural language processing. Therefore, the processor 120 is able to acquire an optical semantic search result for the product. It should be noted that the comment analysis in the embodiment may include the identification, analysis, and filtering based on the semantics of the linguistic items as well as verification and identification on positive/negative polarities of the semantics of the linguistic items. Specifically, the positive/negative polarity may concern, for example, meanings such as an opinion, an attitude, a feeling, and an evaluation expressed in literal contents of the sentence, and such meaning may be assessed. The assessment may be positive, negative, neutral, or others. Accordingly, through natural language processing, an attributive linguistic result indicated by the polarity of the commentary may be further analyzed. In addition, based on the attributive linguistic result, the electronic device 100 may provide reference to the user when the user makes a purchase.

Figure 5:
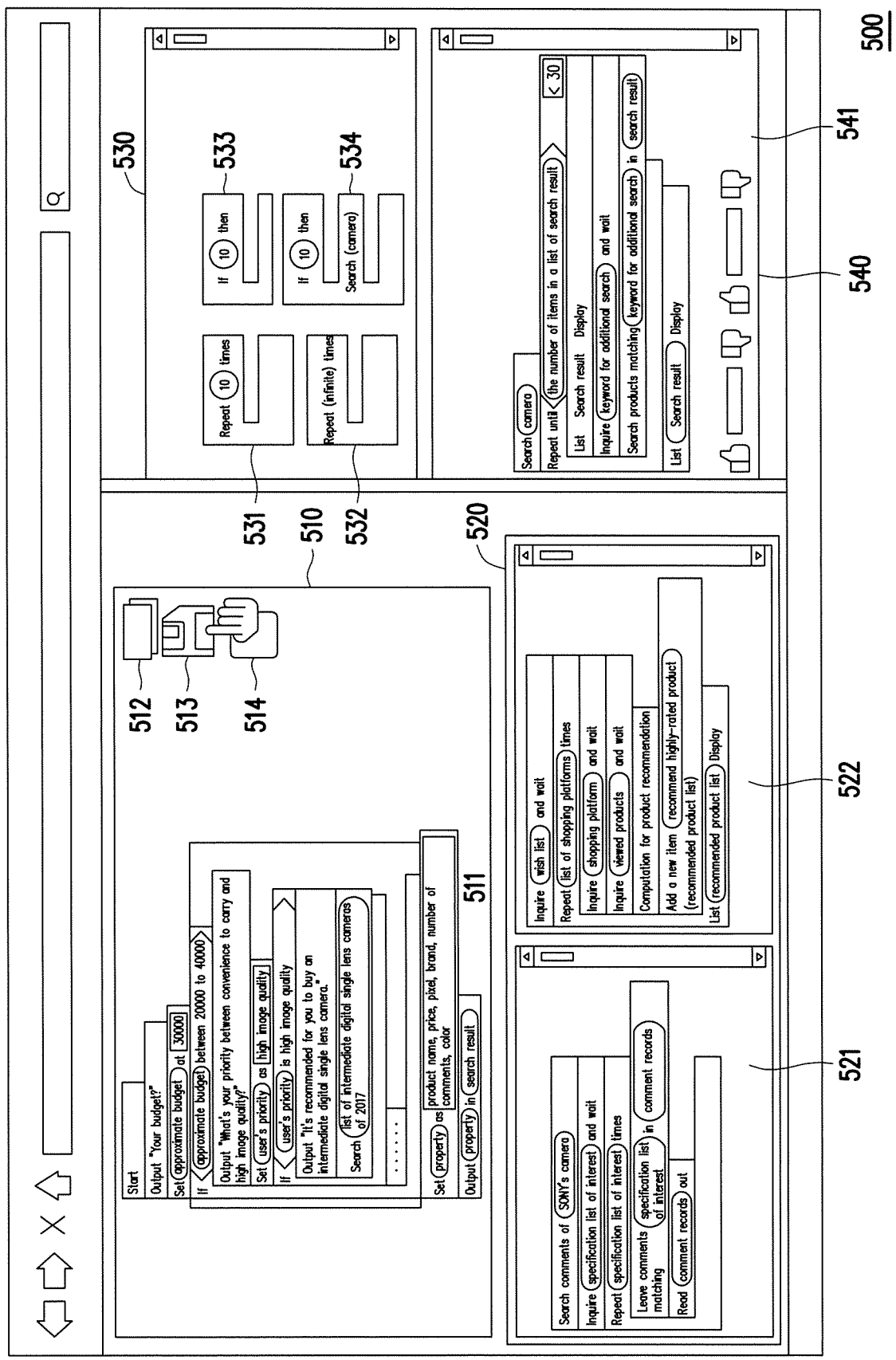
FIG. 5 is a schematic view illustrating an editing interface in a display frame of a display according to another embodiment of the disclosure.

Referring to FIGS. 1 and 5, FIG. 5 is a schematic view illustrating an editing interface 500 in a display frame of the display 130 according to another embodiment of the disclosure. The editing interface 500 may include a first display window 510, a decision-making block display window 520, a decision-making sub-process editing window 530, and a guidance region window 540. The first display window 510 presents a decision-making process module 511 for the particular object (e.g., the product or service that the user intends to purchase). The first display window 510 may further include an execution button 512, a save button 513, and a share button 514. The execution button 512 is provided for the processor 120 to execute the adjusted or edited decision-making process module 511. In other words, after completing the adjustment or editing of the decision-making process module 511 with personalization, the user may manually click the execution button 512 in the first display window 510 to display a result of the decision-making process module 511 on the display frame of the display 130. Besides, the save button 513 is provided for the processor 120 to store the decision-making process module 511 adjusted or edited by the user in the memory 110. In other words, by manually clicking on the save button 513 in the first display window 510, the user may store the decision-making process module 511 currently adjusted or edited. Moreover, the share button 514 is provided for the processor 120 to export and share the edited decision-making process modules to a network server or a relevant database.

Besides, the decision-making block display window 520 may display decision-making blocks 521 and 522 set in default or built in the processor 120. In other words, the decision-making blocks 521 to 522, such as the brand, color, size, function, and/or the like of the product that the user intends to purchase, may be set in advance in the processor 120. The decision-making block display window 520 may also include the decision-making blocks 521 to 522 obtained from the network. For example, the decision-making blocks 521 to 522 may also be the decision-making blocks 521 to 522 built by other users on the network for the product, and the other users may provide the decision-making blocks 521 to 522 to a server on the network for others to download. In other words, in the embodiment, the decision-making blocks 521 and 522 in the decision-making block display window 520 may also be the decision-making blocks 521 to 522 shared by other users on the network in addition to being the decision-making blocks 521 to 522 set in default in the processor 120. Accordingly, the user may build his/her own decision-making process module 511 with personalization after referring to others' considerations or preferences.

Furthermore, the decision-making sub-process editing window 530 presents an editing frame for the processor 120 to edit the decision-making sub-processes 531 to 534. Specifically, the user may drag one or some of the decision-making sub-processes 531 to 534 and one or some of the decision-making blocks 521 to 522 in the decision-making block display window 520 to the first display window 510 for adjustment or editing. Also, the user may manually set one or some parameters in the decision-making sub-processes 531 to 534 based on one or part of the product information in the decision-making blocks 521 to 522.

The guidance region window 540 presents an adjusted or edited decision-making process module 541 of the product obtained from the network. Specifically, what is displayed in the guidance region window 540 may be the decision-making process module 541 shared or built by an expert in the field of the product. Hence, the user may obtain and consider the decision-making process module 541 provided by the expert from the network through the processor 120 for the user's decision making when making a purchase.

In the embodiment, the editing interface 500 may also be applicable on a webpage or a mobile application of the electronic device 100. Nevertheless, the disclosure is not limited thereto. Specifically, in the embodiment, a platform for the user to drag an item may be provided in the webpage or the mobile application of the electronic device 100. For example, the user may drag an item on the editing interface 500, and may call an application programming interface (API) disposed externally through the processor to obtain relevant information processed by natural language processing. Accordingly, the user may set an input field provided in the decision-making block for the particular object based on personal needs (e.g., shopping management, desired price, social platform, desired product, shipping requirement, desired payment method, desired sales information, and/or the like), so as to obtain relevant information of the particular object. On the other hand, in the embodiment, the user may further store the adjusted or edited decision-making process module 541 in the extensible markup language (XML) and share the decision-making process module 541 to the network for others to download through the share button 514.

Figure 6:
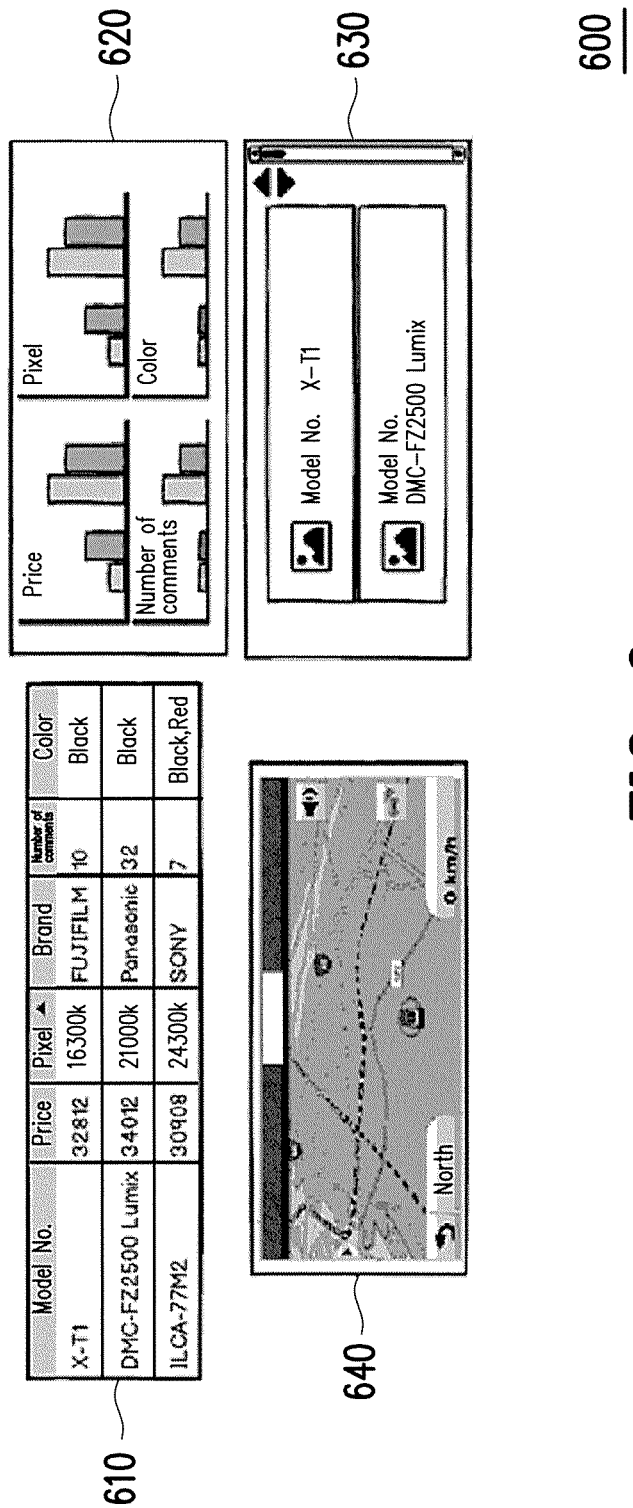
FIG. 6 is a schematic view illustrating a result display interface of a decision-making process module according to another embodiment of the disclosure.

Referring to FIGS. 1, 5, and 6, FIG. 6 is a schematic view illustrating a display interface 600 of a decision-making process module 500 according to another embodiment of the disclosure. The display interface 600 may include a second display window 610, a third display window 620, a fourth display window 630, and a fifth display window 640. In the second display window 610, results of the particular objects (e.g., the product or service that the user intends to purchase) for different parameters set in the decision-making sub-processes 531 to 534 are presented according to a result of the decision-making process module 511 in the first display window 510. For example, assuming that the user sets the model number, price, pixel, brand, number of comments, and color of the product as mainly considered decision-making parameters and a sequence thereof as a sequence of the mainly considered decision-making parameters in the decision-making sub-processes 531 to 534, the processor 120 may refer to the parameters and obtain the relevant information of the product from the network, so as to display the analyzed and categorized product information in the second display window 610.

The processor 120 may generate a corresponding comparative diagram in the third display window 620 based on the product information in the second display window 610. A table and a bar graph may be respectively adopted in the second display window 610 and the third display window 620 to present the relevant information of the product and the comparative diagram. However, the disclosure is not limited thereto. Besides, the processor 120 may also generate a corresponding selection sequence of a plurality of product items based on the sequence of arrangement in the decision-making process module 511. Specifically, after the processor 120 obtains a plurality of products matching the parameters set in the decision-making sub-processes 531 to 534 from the network, the processor 120 may arrange the selection sequence of the products matching the result of the decision-making process module 511 based on the result of the decision-making process module 511 in the first display window 510. In other words, the user may choose the product that most matches the personal consideration or preference based on the selection sequence of the products.

In the embodiment, the fifth display window 640 in the display frame may present a location of a merchant of the product. Specifically, in the embodiment, the processor 120 may determine a merchant location or merchant information of the product through a navigation layer (not shown). The navigation layer may be implemented through special software or firmware or implemented through specialized hardware. Hence, the user may learn the merchant location or merchant information through the fifth display window 640 to make a plan for time and a route for purchasing the product. It should be noted that, in the embodiment, if the user intends to use a product recommendation function, the user may generate a recommendation list, such as a wish list or a shopping platform, from the edited decision-making process module 511. Hence, the user may provide a wish list to recommend the product. Also, the user may define a shopping platform of interest and is thereby able to design based on his/her own preference on an operating platform 1.

Figure 7:
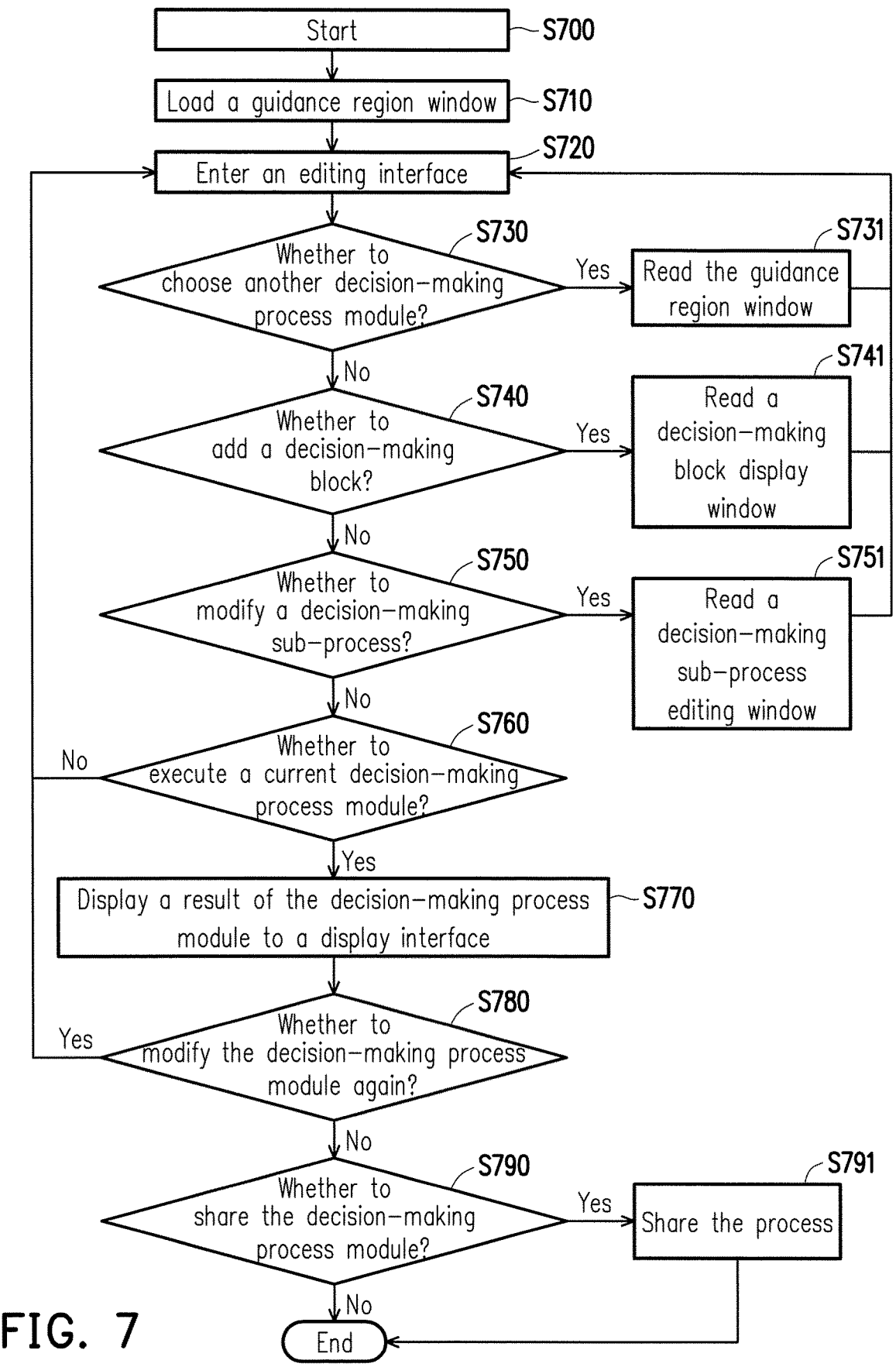
FIG. 7 is a flowchart illustrating operations of an editing interface and a display interface according to another embodiment of the disclosure.

Referring to FIGS. 1, 5, and 7, FIG. 7 is a flowchart illustrating operations of the editing interface 500 and the display interface 600 according to another embodiment of the disclosure. At Step S700, a processor starts an electronic device. At Step S710, the processor may import a decision-making process module provided by an expert and obtained from a network into a guidance region window. At Step S720, the user may enter an editing interface to adjust or edit the decision-making process module. In the embodiment, Step S710 may proceed or follow Step S720, so the order between Step S710 and S720 is not limited herein. At Step S710, the processor may determine whether the user needs to choose another decision-making process module. If it is determined that the user intends to take the decision-making process module provided by the expert into consideration, the processor may perform Step S731. If it is determined that the user does not intend to take the decision-making process module provided by the expert into consideration, the processor may perform Step S740. At Step S731, the processor may read the guidance region window to the editing interface for the user to take the decision-making process module provided by the expert into consideration.

Then, at Step S740, the processor may determine whether the user needs to add another decision-making block to adjust or edit the decision-making process module in the first display window. If it is determined that the user intends to use a decision-making block that is built in or obtained from other users on the network, Step S741 is performed. If it is determined that the user does not intend to use a decision-making block that is built in or obtained from other users on the network, the processor may perform Step S750. At Step S741, the processor may read a decision-making block in a decision-making block display window to the editing interface for the user to adjust or edit the decision-making block. At Step S750, the processor may determine whether the user needs to modify a parameter in a decision-making sub-process. If it is determined that the user needs to reset the parameter in the decision-making sub-process, Step S751 is performed. If it is determined that the user does not need to reset the parameter in the decision-making sub-process, the processor may perform Step S760. At Step S751, the processor may read a decision-making sub-process editing window to the editing interface for the user to further adjust or edit the parameter in the decision-making sub-process. In the embodiment, an order of performing Steps S730, S740, and S750 is not specifically limited.

Besides, at Step S760, the processor may determine whether the user needs to execute the decision-making process module currently in the first display window. If it is determined that the user intends to execute the current decision-making process module, Step S770 is performed. If it is determined that the user does not intend to execute the current decision-making process module, the processor may perform Step S720. When performing Step S770, the processor may display a result of the decision-making process module displayed in the first display window in a display interface for the user to obtain relevant information about a particular object. Then, at Step S780, the processor may determine whether the user needs to modify the decision-making process module in the first display window again. If it is determined that the user intends to adjust or edit the decision-making process module again, Step S720 is performed. If it is determined that the user does not intend to adjust or edit the decision-making process module again, the processor may perform Step S790. At Step S790, the processor may determine whether the user intends to share the decision-making process module in the first display window to the network. If it is determined that the user intends to share the adjusted or edited decision-making process module to the network, the processor may perform Step S791. If it is determined that the user does not intend to share the adjusted or edited decision-making process module to the network, the processor may perform. Step S792. At Step S791, the processor may share the adjusted or edited decision-making process module with personalization through a server. At Step S792, the processor may end the operation of the editing surface.

Figure 8:
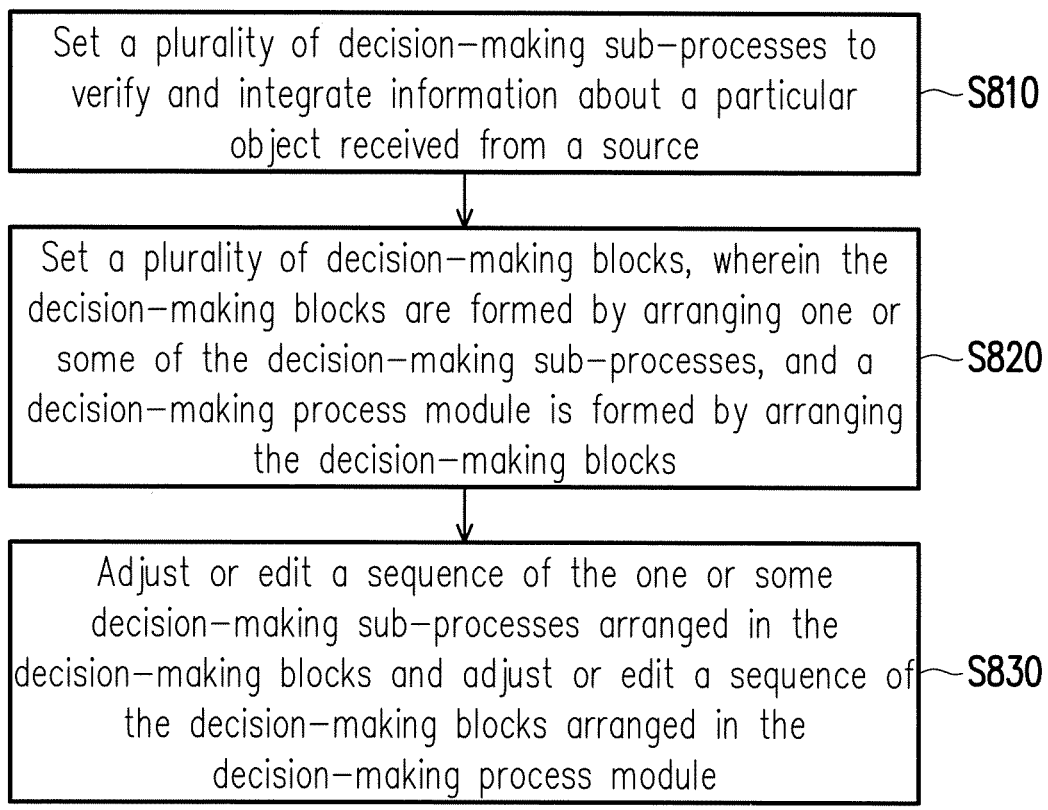
FIG. 8 is a flowchart illustrating a presentation method for a decision-making process module according to an embodiment of the disclosure.

Referring to FIGS. 1 and 8, FIG. 8 is a flowchart illustrating a presentation method for a decision-making process module according to an embodiment of the disclosure. At Step S810, the processor sets a plurality of decision-making sub-processes to verify and integrate information about a particular object received from a source. At Step S820, the processor sets a plurality of decision-making blocks. The decision-making blocks are formed by arranging one or some of the decision-making sub-processes, and the decision-making process module is formed by arranging the decision-making blocks. At Step S830, the processor may adjust or edit a sequence of one or some of the decision-making sub-processes arranged in the decision-making blocks. In addition, the processor may also adjust or edit a sequence of the decision-making blocks in the decision-making process module.

Details of implementing the foregoing steps are already described in the above embodiments, and thus will not be repeated in the following.

In the embodiment, the user may execute the presentation method for the decision-making process module through a non-volatile computer readable medium. The non-volatile computer readable medium may store a plurality of programming codes (e.g., programming codes for performing the relevant functions, but the disclosure is not limited thereto), and the programming codes may be loaded to the processor for the processor to perform the relevant functions. It should be noted that the non-volatile computer readable medium may include, for example, a CD-ROM, a universal serial bus (USB) device, or any other memory devices with a non-volatile property. Nevertheless, the disclosure is not limited thereto.

In view of the foregoing, the electronic device and the presentation method for the decision-making process module according to the embodiments of the disclosure allow the user to build a combination of various decision-making sub-processes for making a purchase on his/her own, so as to form the decision-making process module. Specifically, the decision-making sub-processes may be obtained based on the relevant information (e.g., relevant information and comments about the product or the service) on the network, and the decision-making sub-processes may be arranged to form the decision-making blocks. The user may also adjust or edit the decision-making blocks through the processor based on personal needs, so as to build the decision-making process module with personalization. Besides, the user may also share the edited decision-making process module to the network for the reference of other users afterwards. Hence, the user may refer to information such as the specification, recommendation information, expert's suggestion and/or the like about the relevant object (product or service) from the network through the decision-making process module built by others and thus spend less time on browsing the information about the object. Hence, the efficiency and the willingness for consumers to make a purchase are facilitated.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An electronic device, comprising:
a memory;
a processor, coupled to the memory and generating a purchase decision-making process module, wherein the purchase decision-making process module serves to assist a consumer in determining whether a particular object is suitable to be purchased; and
a display, coupled to the processor to present the purchase decision-making process module,
wherein the purchase decision-making process module comprises:
a plurality of purchase decision-making sub-processes, verifying and integrating purchase information about the particular object received from a source; and
a plurality of purchase decision-making blocks, formed by arranging one or some of the purchase decision-making sub-processes, wherein the purchase decision-making process module is formed by arranging the purchase decision-making blocks,
wherein
a sequence of the one or some of the purchase decision-making sub-processes arranged in the purchase decision-making blocks is adjusted or edited by the processor,
a sequence of the purchase decision-making blocks arranged in the purchase decision-making process module is adjusted or edited by the processor, and
determination equations are captured from the adjusted or edited purchase decision-making process module for searching the purchase information associated with the particular object through a network and presents a personalized purchase information on the display based on the determination equations.

2. The electronic device as claimed in claim 1, wherein the one or some of the purchase decision-making sub-processes analyze, filter, and sort the purchase information about the particular object received from the source through natural language processing.

3. The electronic device as claimed in claim 1, wherein the purchase decision-making process module is transmitted to a server by the processor to be shared on the network.

4. The electronic device as claimed in claim 1, wherein the purchase information about the particular object received from the source in the purchase decision-making sub-processes comprises:
at least one or a combination of the purchase decision-making process module of the particular object recommended by an expert, insights or experiences shared in social groups related to the particular object, a brand of the particular object, a price, and a shipping method, a payment method and sales information influential to decision-making of the consumer.

5. The electronic device as claimed in claim 1, wherein a display frame of the display comprises an editing interface, and the editing interface comprises:
a first display window, presenting the purchase decision-making process module of the particular object;
a decision-making block display window, presenting the purchase decision-making blocks of the particular object that are set in default or built in; and
a decision-making sub-process editing window, presenting an editing frame for editing the purchase decision-making sub-processes through the processor.

6. The electronic device as claimed in claim 5, wherein the decision-making block display window further comprises the purchase decision-making block obtained from the network.

7. The electronic device as claimed in claim 5, wherein the editing interface further comprises:
a guidance region window, presenting the adjusted or edited purchase decision-making process module of the particular object that is obtained from the network.

8. The electronic device as claimed in claim 5, wherein the first display window further comprises:
an execution button, provided for the processor to execute the adjusted or edited purchase decision-making process module;
a save button, provided for the processor to store the adjusted or edited purchase decision-making process module to the memory; and
a share button, provided for the processor to export and share the edited purchase decision-making process module.

9. The electronic device as claimed in claim 1, wherein a display frame of the display further comprises a result display interface of the purchase decision-making process module, and
the result display interface of the purchase decision-making process module comprises:
a second display window, presenting results of a plurality of particular objects for a plurality of different parameters according to a result of the purchase decision-making process module in the first display window;
a third display window, generating a corresponding diagram of a comparative result based on the second display window; and
a fourth display window, generating a corresponding selection sequence of the particular objects based on the sequence arranged in the purchase decision-making process module.

10. The electronic device as claimed in claim 9, wherein the second display window and the third display window present the comparative result through a table or a bar graph.

11. The electronic device as claimed in claim 8, wherein the result display interface of the purchase decision-making process module further comprises:
a fifth display window, presenting a merchant location of the particular object.

12. A presentation method for a purchase decision-making process module, comprising:
generating or obtaining a purchase decision-making process module, wherein the purchase decision-making process module serves to assist a consumer in determining whether a particular object is suitable to be purchased; and
presenting the purchase decision-making process module, wherein generating or obtaining the purchase decision-making process module comprises:
setting a plurality of purchase decision-making sub-processes to verify and integrate purchase information about the particular object received from a source;
setting a plurality of purchase decision-making blocks formed by arranging one or some of the purchase decision-making sub-processes, wherein the purchase decision-making process module is formed by arranging the purchase decision-making blocks;
adjusting or editing a sequence of the one or some of the purchase decision-making sub-processes arranged in the purchase decision-making blocks;
adjusting or editing a sequence of the purchase decision-making blocks arranged in the purchase decision-making process module; and
capturing determination equations from an adjusted or edited purchase decision-making process module for searching purchase information associated with the particular object through a network and presenting a personalized purchase information on a display based on the determination equations.

13. The presentation method as claimed in claim 12, wherein setting the purchase decision-making sub-processes to verify and integrate the purchase information about the particular object received from the source comprises:
analyzing, filtering, and sorting the purchase information about the particular object received from the source through natural language processing.

14. The presentation method as claimed in claim 12, wherein the purchase decision-making process module is transmitted to a server by a processor to share the purchase decision-making process module to the network.

15. The presentation method as claimed in claim 12, wherein the purchase information about the particular object received from the source comprises:
at least one or a combination of the purchase decision-making process module of the particular object recommended by an expert, insights or experiences shared in social groups related to the particular object, a brand of the particular object, a price, and a shipping method, a payment method and sales information influential to decision-making of the consumer.

16. The presentation method as claimed in claim 12, wherein presenting the purchase decision-making process module comprises:
presenting the purchase decision-making process module of the particular object;
presenting the purchase decision-making blocks of the particular object that are set in default or built in; and
presenting an editing frame for editing the purchase decision-making sub-processes.

17. The presentation method as claimed in claim 16, wherein presenting the purchase decision-making blocks of the particular object that are set in default or built in comprises:
obtaining the purchase decision-making blocks from the network.

18. The presentation method as claimed in claim 16, wherein presenting the purchase decision-making process module further comprises:
presenting the adjusted or edited purchase decision-making process module of the particular object obtained from the network.

19. The presentation method as claimed in claim 12, wherein presenting the purchase decision-making process module further comprises:
presenting results of a plurality of particular objects for a plurality of different parameters according to a result of the purchase decision-making process module in a first display window;
generating a corresponding diagram of a comparative result based on a second display window; and
generating a corresponding selection sequence of the particular objects based on the sequence arranged in the purchase decision-making process module.

20. The presentation method as claimed in claim 12, wherein presenting the purchase decision-making process module further comprises:
presenting a merchant location of the particular object.

21. A non-volatile computer readable medium, storing a plurality of programming codes, wherein the programming codes are loaded to a processor to perform the presentation method as claimed in claim 12.

* * * * *